(12) United States Patent
Dick (10) Patent No.: US 7,000,937 B2
(45) Date of Patent: Feb. 21, 2006

(54) OFFSET COUPLER FOR KINGPIN TRAILER

(75) Inventor: Bernard L. Dick, Chanute, KS (US)

(73) Assignee: PopUp Industries, Inc., Chanute, KS (US)

( * ) Notice: Subject to any disclaimer, the term of this patent is extended or adjusted under 35 U.S.C. 154(b) by 0 days.

(21) Appl. No.: 10/689,105

(22) Filed: Oct. 20, 2003

(65) Prior Publication Data

US 2005/0082787 A1    Apr. 21, 2005

(51) Int. Cl.
*B60D 1/07* (2006.01)
(52) U.S. Cl. .................................. 280/416.1; 280/433
(58) Field of Classification Search ............... 280/433, 280/425.1, 441.2, 415.1, 416.1, 417.1, 418.1
See application file for complete search history.

(56) References Cited

U.S. PATENT DOCUMENTS

| 1,977,013 | A | * | 10/1934 | Robb ...................... 280/416.3 |
| 3,163,306 | A | * | 12/1964 | Bennett et al. ............. 414/498 |
| RE26,303 | E | * | 11/1967 | Chew ...................... 280/418.1 |
| 3,796,444 | A |   | 3/1974  | Hixon |
| 5,240,270 | A |   | 8/1993  | Colibert |
| 5,890,728 | A | * | 4/1999  | Zilm ......................... 280/433 |
| 6,024,372 | A |   | 2/2000  | Colibert |
| 6,135,482 | A |   | 10/2000 | Larkin |
| 6,186,530 | B1 |   | 2/2001 | Zilm |
| 6,398,250 | B1 |   | 6/2002 | Hashman |
| 6,416,073 | B1 |   | 7/2002 | Marcy |
| 6,540,246 | B1 |   | 4/2003 | Andersen |
| 6,629,700 | B1 |   | 10/2003 | Baptiste |

* cited by examiner

*Primary Examiner*—Kevin Hurley
(74) *Attorney, Agent, or Firm*—Shook, Hardy & Bacon L.L.P.

(57) ABSTRACT

An offset coupler device for increasing the relative distance between a tow vehicle having a fifth wheel hitch and a trailer having a kingpin during use is provided. The offset coupler has an upper plate member with an opening therein for receiving the kingpin of the trailer. A clamp member is clamped on the kingpin of the trailer and includes a means for pressing the upper plate member into abutting engagement with a skid plate of the trailer. A lower plate member of the offset coupler has a kingpin depending downwardly from a lower surface thereof. The kingpin of the offset coupler is spaced apart laterally from the opening to provide an offset. Once the offset coupler is coupled with the trailer, the trailer is coupled with the tow vehicle by receiving the kingpin of the offset coupler in the fifth wheel hitch.

24 Claims, 7 Drawing Sheets

OFFSET COUPLER FOR KINGPIN TRAILER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a device used to facilitate coupling a kingpin trailer with a tow vehicle. More particularly, this invention relates to an offset coupler for use in connecting a kingpin trailer with a fifth wheel hitch to permit the relative space between the tow vehicle and the kingpin trailer to be increased.

By virtue of the numerous advantages received over bumper pulled trailers, gooseneck trailers and kingpin trailers have received virtually universal acceptance in the towing of large trailers. Kingpin trailers are used in connection with a fifth wheel hitch mechanism. In this arrangement, the trailer generally has a downwardly depending post that terminates in a fifth wheel kingpin plate or skid plate. The plate generally has a kingpin extending downwardly therefrom. A fifth wheel hitch or fifth wheel receiver is mounted in the bed of a truck for receiving the kingpin. The receiver is similar in appearance and functions similar to the device found on the back of a semi-truck. The receiver is a generally horseshoe shaped device having a flat upper surface. The kingpin is received in the center of the horseshoe shaped receiver and the kingpin plate of the trailer rides on and pivots on the upper surface of the receiver.

The fifth wheel receiver is mounted to the floor of or in the bed of a tow vehicle, such as a pickup truck. The receiver is mounted such that the kingpin, when received in the fifth wheel receiver, is slightly ahead of the rear axle, thereby giving the kingpin trailer/fifth wheel receiver arrangement its advantage over bumper pulled trailers by transferring the weight of the trailer more evenly between the front and rear axles of the tow vehicle and, by virtue of the geometry associated therewith, permitting the load of the trailer to pass directly onto the rear axle of the truck instead of onto its bumper.

While the use of a kingpin trailer/fifth wheel receiver arrangement has numerous benefits, one drawback is found when it is employed in a short bed pickup truck. In recent years, a trend has emerged by truck manufacturers to increase the size of the interior cab space for user comfort. First introduced were stretch cab trucks followed by extended cab trucks and, even more recently, crew cab or four door trucks. While the cabs of these trucks have in essence been lengthened, the wheel base or footprint of these pickup trucks have remained largely unchanged. As a result, the beds of these trucks are respectively shortened. This arrangement permits a truck manufacturer to provide a truck with more interior space, while not sacrificing mobility and maneuverability for the trucks. It also prevents the manufacturers from having to produce longer and longer trucks which might not be as appealing to purchasers.

The new short bed trucks have created a problem with respect to kingpin trailers. The problem is a decrease in the clearance between the nose of the trailer and the rear of the cab of the tow vehicle when the kingpin trailer is coupled with the tow vehicle. Because the bed is shortened, the distance between the fifth wheel receiver and the back of the cab in a short bed truck is shorter than it would normally be in a truck with a standard length bed. Accordingly, the front of the trailer is now closer to the rear of the cab. As a result, the driver of the short bed tow vehicle cannot make as sharp of turns as a driver of a long bed tow vehicle, as discussed in greater detail below.

Another problem associated with kingpin trailers in general can be the clearance between the rear of the truck and the bulkhead of the trailer. Spare tires, propane tanks or other items are often mounted to the outside of the bulkhead of a kingpin trailer. As a result, the distance between the front of the trailer and the back of the truck is effectively shortened. Generally, when coupling a kingpin trailer to a pickup truck, the tailgate of the truck is lowered so that the truck may be backed up towards the trailer until the kingpin is received in the fifth wheel hitch receiver without risk of the kingpin hitting the tailgate. It is often the case, however, that the tailgate would make contact with the item mounted on the front of the bulkhead of the trailer before the kingpin can be received in the fifth wheel hitch. As a result, it is often necessary to back the truck partially under the trailer and then raise the tailgate back up before being permitted to back further under the trailer for coupling.

Therefore, there is a need for a device which permits the user to couple a kingpin trailer with a tow vehicle having a fifth wheel hitch in an arrangement that permits the kingpin trailer to be moved further away from the tow vehicle than permitted by present coupler devices. The present invention fills these and other needs.

BRIEF SUMMARY OF THE INVENTION

In order to overcome the above-stated problems and limitations and to achieve the noted advantages, there is provided an offset coupler for kingpin trailers. The offset coupler has a body portion with an upper plate-like member that abuts the kingpin plate of the fifth wheel or kingpin trailer. An opening in the upper plate member receives the kingpin and a clamping device is received on the kingpin to removeably and frictionally couple the offset coupler with the trailer. Bolts are received through the clamp device to urge the plate member in frictional contact with the kingpin plate to resist movement therebetwen during use.

The offset coupler further includes a body that receives the clamp member and separates the upper plate member from a lower plate member. The lower plate member includes a kingpin extending downwardly therefrom. The kingpin is preferably the same size and shape as the kingpin of the trailer being towed, which is received in the opening in the upper plate member. The kingpin of the offset coupler is located forward of the opening in the upper plate member a distance preferably between five to eighteen inches and more preferably between five to twelve inches. The forward spacing of the kingpin of the offset coupler permits the trailer to be moved rearwardly by the same distance the kingpin of the offset coupler is offset from the opening when the offset coupler is used to connect the kingpin trailer to the fifth wheel hitch of the tow vehicle.

Further objects, features and advantages of the present invention over the prior art will become apparent from the detailed description of the drawings which follows, when considered with the attached figures.

BRIEF DESCRIPTION OF THE SEVERAL VIEWS OF THE DRAWINGS

The features of the invention noted above are explained in more detail with reference to the embodiment illustrated in the attached drawing figures, in which like reference numerals denote like elements, in which FIGS. 1–12 illustrate an embodiment of the present invention, and in which:

DETAILED DESCRIPTION OF THE INVENTION

Figure 1:
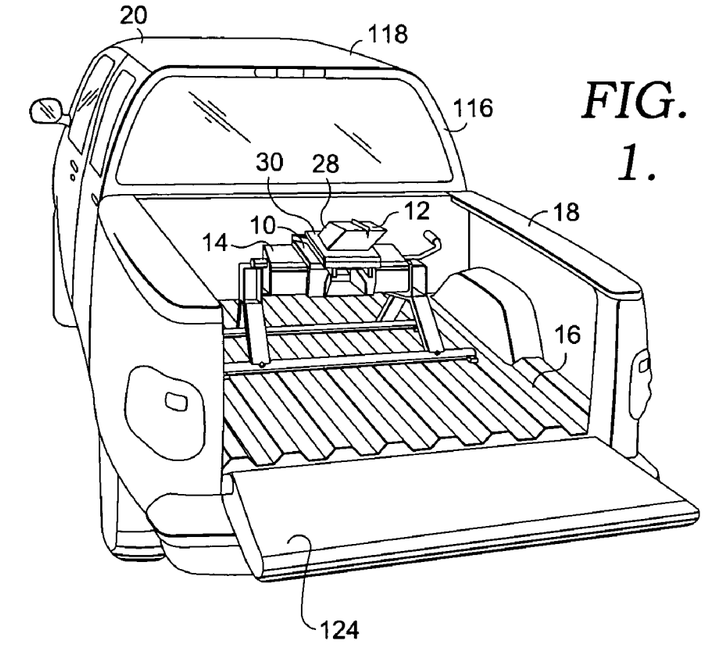
FIG. 1 is a rear perspective view of a tow vehicle with a fifth wheel receiver mounted in the bed thereof and a kingpin trailer coupled thereto, a portion of which has been cut away for clarity, via the offset coupler of the present invention.
Figure 2:
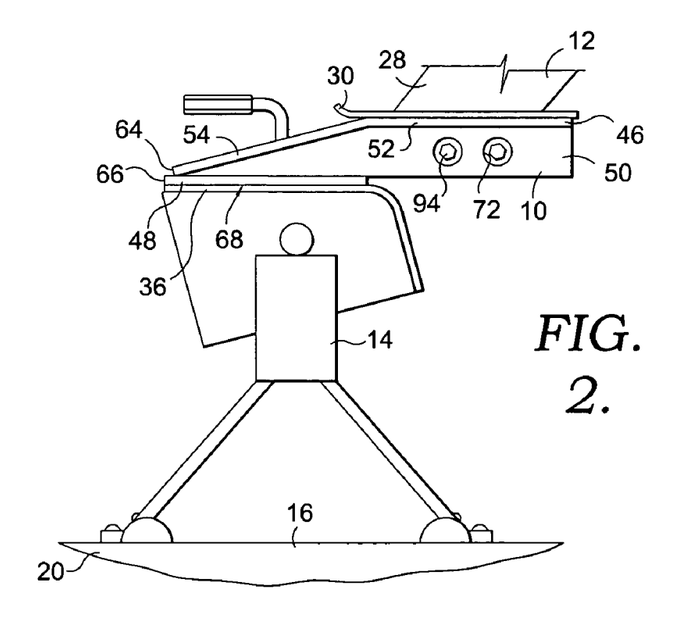
FIG. 2 is a left side elevational view of the offset coupler of FIG. 1 with portions of the tow vehicle and trailer cut away for clarity.
Figure 6:
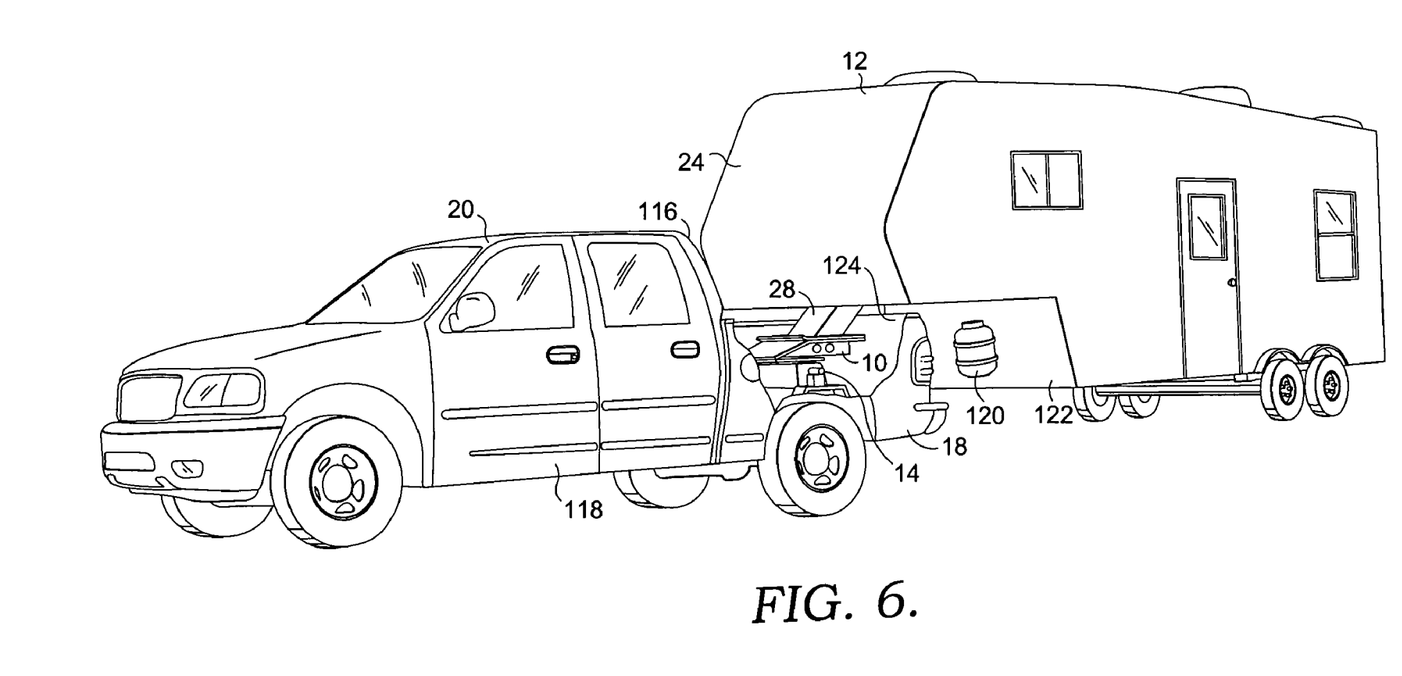
FIG. 6 is a front left side perspective view of a kingpin trailer coupled to a tow vehicle with a fifth wheel hitch via the coupler of the present invention with a portion of the truck bed cut away for clarity.

Referring now to the drawings in more detail and initially to FIG. 1, numeral 10 generally designates a offset coupler of the present invention. The coupler 10 is used to couple a trailer 12 (the majority of which is cut away in FIG. 1 for clarity, but which is illustrated fully in FIG. 6) to a fifth wheel hitch 14. The fifth wheel hitch 14 is generally mounted to a floor 16 of a bed 18 of a tow vehicle 20, such as the illustrated pickup truck.

The trailer 12 can be of any common type, including a travel trailer, a cargo trailer, a flatbed trailer, a livestock trailer or any other type of trailer having a kingpin 22 adjacent a forward end 24 of the trailer 12. The trailer 12 generally has a neck 26 which includes a kingpin box 28. The kingpin box 28 includes a kingpin plate or skid plate 30 at its distal end 32. The kingpin 22 depends downwardly from a lower surface 34 of the skid plate 30.

A fifth wheel hitch 14 includes a fifth wheel plate 36 which is generally U-shaped and a locking mechanism 38 positioned below the fifth wheel plate 36 for locking the kingpin 22 in the fifth wheel hitch 14 during use. The fifth wheel hitch 14 can be any commercially available fifth wheel hitch and its operation is well known in the art.

Generally, to connect the tow vehicle 20 with the fifth wheel hitch 14 to a kingpin trailer 12, the tow vehicle is backed towards the trailer 12 until the kingpin 22 is received in the U-shaped portion of the fifth wheel plate 36. The locking mechanism 38 engages the kingpin 22 and keeps the trailer 12 coupled with the tow vehicle 20. The lower surface 34 of the skid plate 30 abuts and is supported on an upper surface 40 of the fifth wheel plate 36 during use. The locking mechanism 38 of the fifth wheel hitch 14 can be of any type known in the art.

Figure 3:
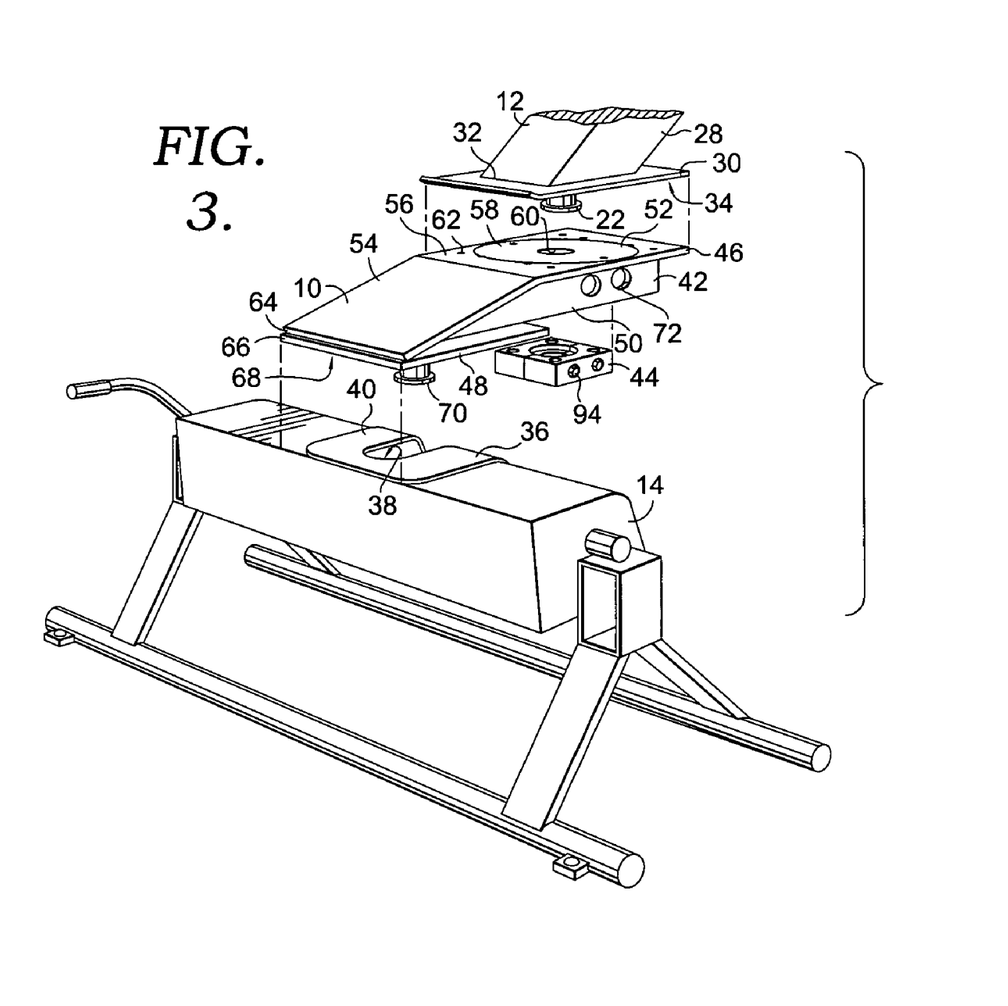
FIG. 3 is an exploded perspective view of a front and left side of the coupler of the present invention illustrating its relationship to the fifth wheel hitch and the trailer during use.

Turning now to FIG. 3, the coupler 10 includes a body portion 42 and a clamp member 44. The body portion 42 preferably has an upper plate member 46 and a lower plate member 48. The two plate members 46, 48 are preferably spaced apart by supports 50. It should be noted that, while the illustrated embodiment discloses a body portion 42 made up of various components that have been preferably welded together, it is within the scope of the present invention to provide a body portion 42 that has been fabricated from a single piece of stock.

The upper plate member 46 preferably includes a first horizontal portion 52 and a second sloped portion 54. The first horizontal portion 52 has an upper surface 56 that is intended to abut the lower surface 34 of the skid plate 30 during use. The upper surface 56 preferably includes a circular recess 58. The circular recess is a slight depression in the upper surface 56 to permit a more secure abutment between the upper plate member 46 and the skid plate 30 in the event that the lower surface 34 of the skid plate 30 includes any irregularities, such as welding splatter. The circular recess 58 is preferably very shallow. In that regard, the circular recess preferably has a depth of around $\frac{1}{32}$ of an inch.

The upper plate member 46 preferably includes an opening 60 there through for receiving the kingpin 22 of the trailer 12. The opening 60 is preferably located in the center of the first horizontal portion 52 of the upper plate member 46 and is preferably sized to fit closely around the outer dimension of a standard kingpin. In that regard, the opening 60 is preferably circular with a diameter of approximately three inches, and more particularly preferably 2.885 inches in diameter. The upper plate member 46 also preferably includes a plurality of guide holes 62 which can be used in combination with the clamp member 44 to provide a more secure connection between the offset coupler 10 and the trailer 12. The guide hole 62 can be used as a guide to drill holes into the skid plate 30. The user can then use self-tapping bolts (not shown) through the guide holes 62 up into the holes drilled in the skid plate 30.

The sloped portion 54 of the upper plate member 56 preferably slopes down from a horizontal portion 52 to a forward edge 64. The forward edge 64 of the sloped portion 54 preferably abuts or is adjacent to a forward edge 66 of the lower plate member 48. The lower plate member 48 is preferably parallel to the first horizontal portion 52 of the upper plate member 46. The lower plate member 48 has a lower surface 68 which abuts the upper surface 40 of the fifth wheel plate 46 during use. The offset coupler 10 also includes a kingpin 70 which extends downwardly from the lower surface 68 of the lower plate member 48. The kingpin 70 is preferably centered on the lower plate member 48 and of standard industry accepted dimensions.

The supports 50 are preferably two vertical walls. The supports taper towards the forward edge 64 of the upper plate member 46 to accommodate the shape of the upper plate member 46. At least one of the supports 50 includes two bores 72 there through to provide the user with access to the clamp member 44 as discussed in greater detail below.

Figure 9:
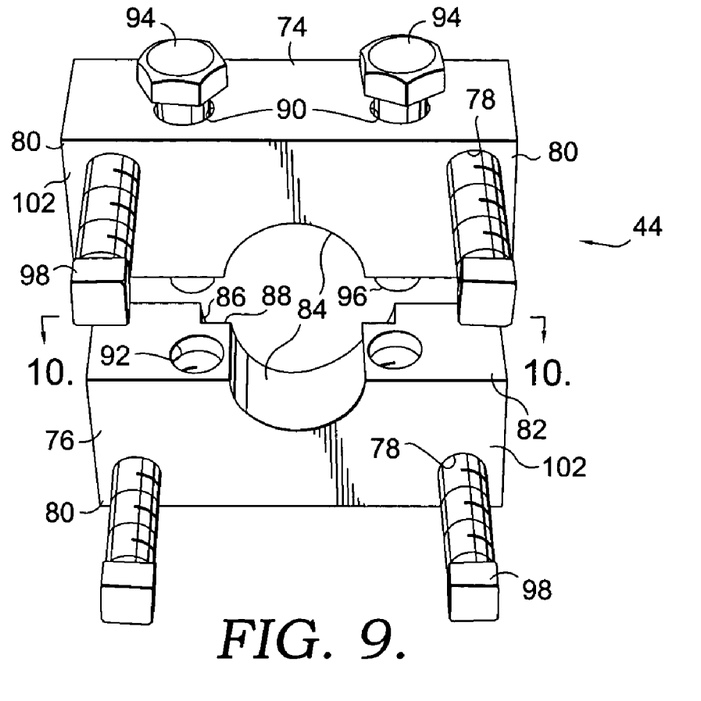
FIG. 9 is a bottom perspective view of the clamp member.

As best illustrated in FIG. 9, the clamp member 44 preferably includes a first block member 74 and a second block member 76. The block members 74, 76 are preferably machined from solid metal stock and are generally rectangular in shape. Each of the block members 74, 76 preferably have a pair of generally vertical passages 78 there through adjacent outer corners 80 thereof. The passages 78 are preferably internally threaded. The block members 74, 76 also each have an inner surface 82. The inner surfaces 82 face one another when the clamp member 44 is assembled during use. Each of the block members 74, 76 also preferably include a generally semi-cylindrical groove 84 in their inner surfaces 82. Each groove 84 includes an enlarged radius portion 86 that provides a ledge 88 that will be discussed in greater detail below.

In machining the generally semi-cylindrical grooves 84 in the block members 74, 76, it has been found beneficial to put the block members 74, 76 together (with the inner surfaces 82 facing one another) with a spacer (not shown) sandwiched there between and drill a vertical bore through the assembled unit. Because the generally semi-cylindrical grooves 84 are formed in the block members 54, 56 with the spacer there between, when the clamp member 44 is coupled to the kingpin 22 of the trailer 12 (as discussed in greater detail below) the inner surfaces 82 of the block members 74, 76 are spaced apart the thickness of the spacer. This permits tighter clamping of the block members 74, 76 to the kingpin 22, as discussed below.

Figure 10:
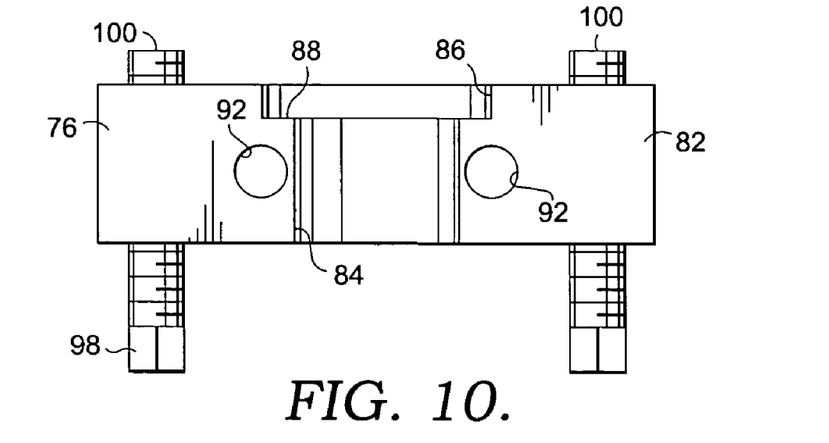
FIG. 10 is a side elevational view of a portion of the clamp member.

The first block member 74 includes a pair of generally horizontal tunnels 90 there through. The tunnels 90 are generally parallel and exit the inner surface 82 on opposite sides of the groove 84. The tunnels 90 are preferably not internally threaded. The second block member 76 preferably includes a pair of generally horizontal bores 92 in the inner surface 82 thereof. The bores 92 are preferably aligned and coaxial with the tunnels 90 in the first block member 74. Additionally, the bores 92 are preferably internally threaded to receive bolts 94. The bolts 94 are received in the tunnels 90 such that distill ends 96 of the bolts 94 are threadably received in the bores 92 of the second block member 76. A plurality of bolts 98 are preferably threadably received in the vertical passages 78 of the block members 74, 76. The bolts 98 are preferably received in the vertical passages 78 by placing distal ends 100 of the bolts 98 in portions of the vertical passages 78 accessible from lower surfaces 102 of the block members 74, 76 so that the bolts 98 are pointing upwardly.

In use, a user should first attach the offset coupler 10 to the trailer 12 and then couple the tow vehicle 20 with the coupler 10 to permit towing of the trailer 12. The kingpin 22 of the trailer 12 is generally cylindrical in nature and is of an industry standard size and shape. The kingpin 22 includes a reduced diameter portion 104 adjacent a distal end 106 of the kingpin 22.

Figure 4:
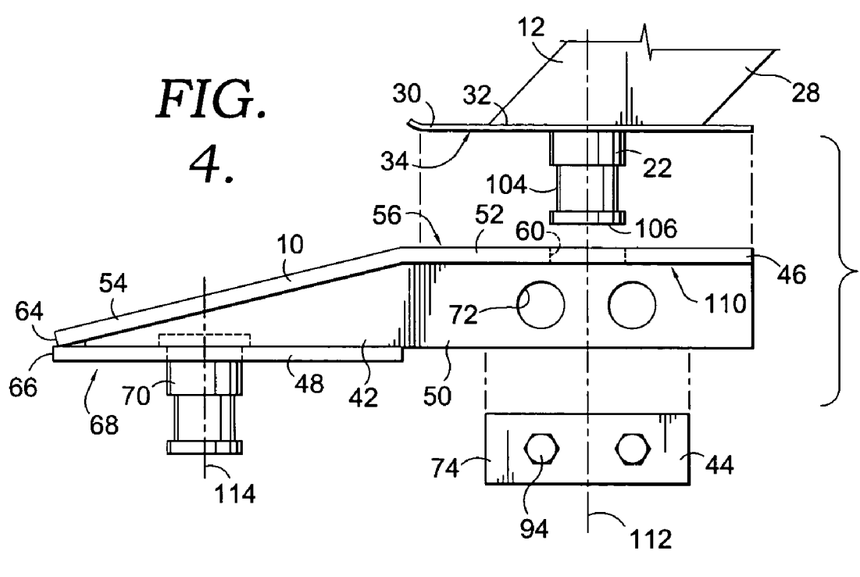
FIG. 4 is an exploded left elevational side view of the coupler.
Figure 5:
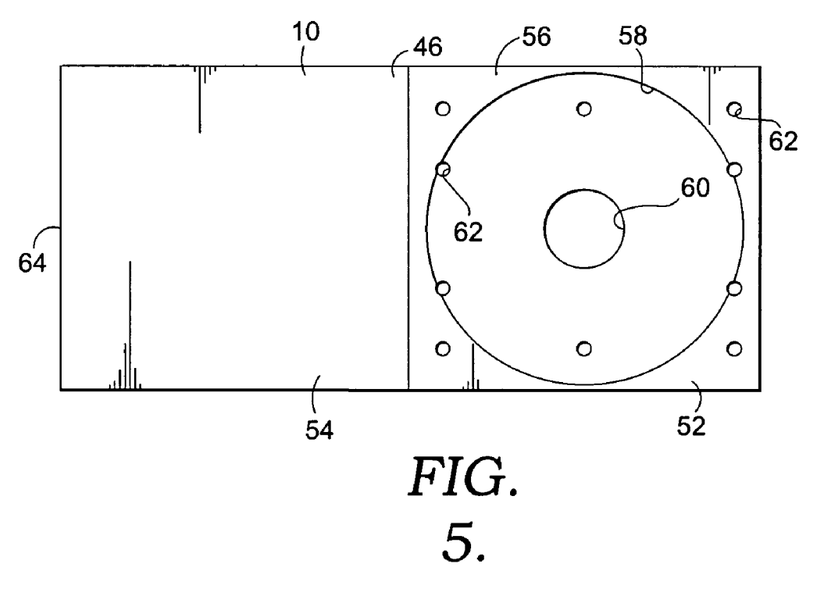
FIG. 5 is a top plan view of the coupler.
Figure 7:
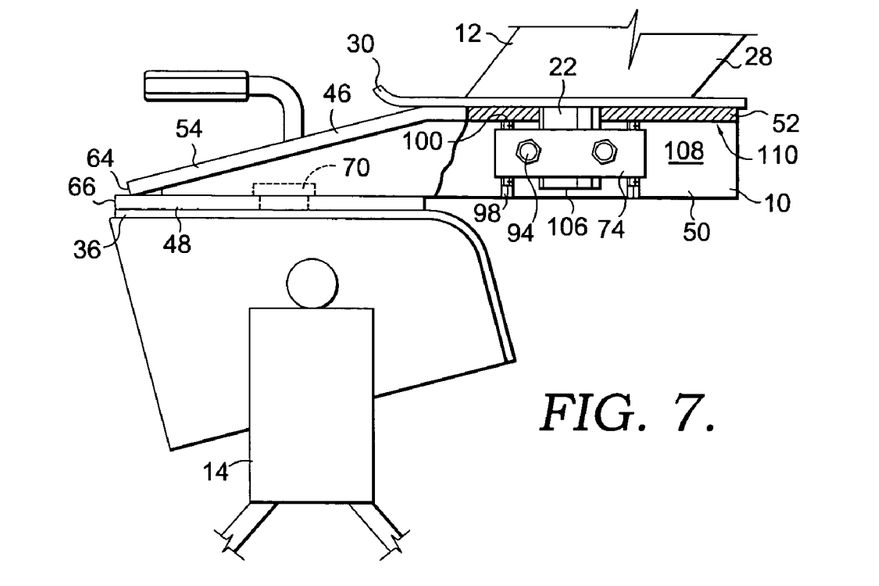
FIG. 7 is a left side elevational view of the arrangement in FIG. 2 with a portion of the coupler cut away for clarity.
Figure 8:
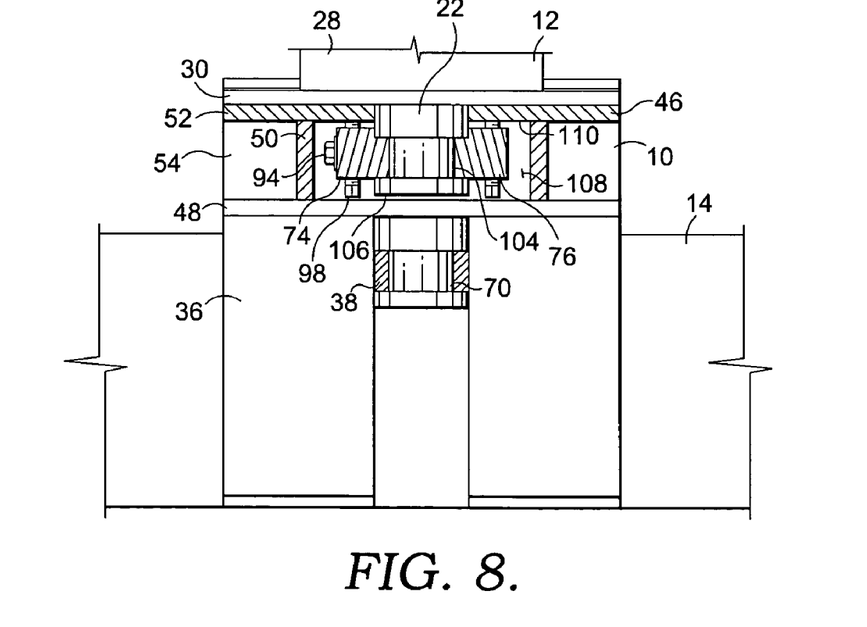
FIG. 8 is a rear side elevational view of the embodiment of FIG. 7 with a portion of the coupler cut away for clarity.

To couple the offset coupler 10 with the trailer 12, the kingpin 22 is first received in the opening 60 in the upper plate member 46 such that the distal end 106 of the kingpin 22 is in an area 108 that is below the upper plate member and intermediate the supports 50, as best illustrated in FIGS. 7 and 8. The block members 74, 76 are then inserted up into the area 108 and placed on opposite sides of the kingpin 22 so that the semi-cylindrical grooves 84 abut and generally encircle the reduced diameter portion 104 of the kingpin 22. The enlarged radius portions 86 of the block members 74, 76 preferably receive a portion of the kingpin 22 above the reduced diameter portion 104, as illustrated in FIGS. 4 and 8. The block members 74, 76 are positioned on the kingpin 22 such that the heads of the bolts 94 are accessible through the bores 72 in the supports 50 of the body portion 42.

The user then tightens the bolts 94 thereby drawing the block members 74, 76 together generally around the kingpin 22 and clamping the clamp member 44 onto the kingpin 22. Once the clamp member is securely coupled with the kingpin 22, the user then screws the bolts 98, the heads of which are accessible below the clamp member 44, further into the clamp member 44 until the distal ends 100 of the bolts 98 abut a lower surface 110 of the upper plate member 46.

As the user continues to tighten the bolts 98, the bolts 98 force the upper plate member 46 away from the clamp member 44 and into abutting contact with the lower surface 34 of the skid plate 30 of the trailer 12. The more the user tightens the bolts 98, the greater the force pressing the upper plate member 46 in contact with the skid plate 30. This force creates a frictional relationship that will resist movement there between during use. Additionally, for a more secure connection between the offset coupler 10 and the trailer 12, the user can insert self-tapping bolts (not shown) through guide holes 62 up into the holes drilled in the skid plate 30 for a mechanical connection.

Once the body portion 42 and the clamp member 44 are coupled with the trailer 12, the trailer 12 now essentially functions as any other kingpin trailer. A user can now couple their tow vehicle 20 with a fifth wheel hitch 14 to the trailer 12 in the same manner they would have coupled their tow vehicle 20 to the trailer 12 before the offset coupler 10 was attached thereto. However, now that the offset coupler 10 is coupled to the trailer 12, the fifth wheel hitch 14 receives the kingpin 70 of the offset coupler 10, instead of the kingpin 22 of the trailer 12.

As best illustrated in FIG. 4, the kingpin 22 of the trailer 12 has a central longitudinal axis 112 and the kingpin 70 of the offset coupler 10 has a central longitudinal axis 114. When the kingpin 22 is received in the opening 60 and the coupler 10 is coupled with the trailer 12, the central longitudinal axes 112, 114 of the kingpins 22, 70 are generally parallel to one another with the body portion 42 spacing the kingpin 70 forward of the kingpin 22. As a result, when the coupler 10 is used, the coupler effectively moves the trailer rearwardly from the tow vehicle the distance between the longitudinal axis 114 of the kingpin 70 and the center point of the opening 60. Preferably, this offset distance is between 3–12 inches. More particularly, an offset distance of nine inches has been found beneficial.

Figure 11:
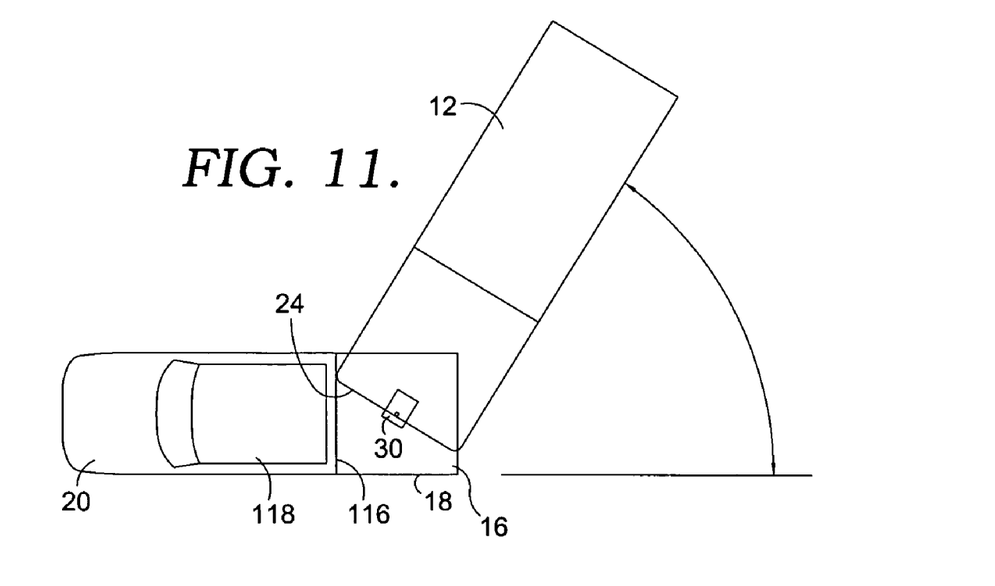
FIG. 11 is a schematic plan view of a kingpin trailer coupled with a short bed tow vehicle without the use of the present invention.
Figure 12:
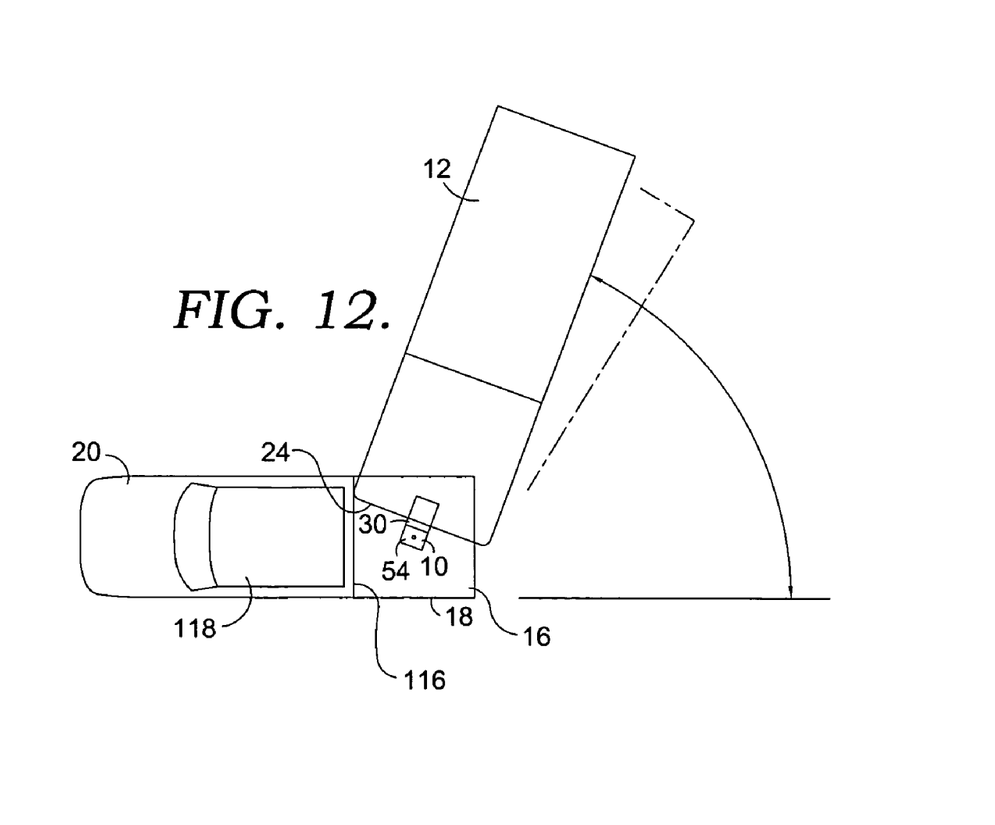
FIG. 12 is a schematic plan view of the kingpin trailer coupled with the short bed tow vehicle via the offset coupler of the present invention, illustrating an increased turn angle permitted thereby.

Turning now to FIGS. 11 and 12, FIG. 11 illustrates a standard kingpin trailer 12 coupled with a tow vehicle 20 via a fifth wheel hitch 14 (not illustrated) in the conventional manner. FIG. 11 illustrates the maximum turn angle that could be achieved when the tow vehicle is pulling or backing the trailer 12 before the forward end 24 of the trailer would impact a rear 116 of a cab 118 of the tow vehicle 20. In contrast, FIG. 12 illustrates the increased turning angle that may be achieved by moving the trailer 12 further back from the tow vehicle 20 by using the offset coupler 10 of the present invention.

Additionally, and as discussed above, FIG. 6 illustrates the common situation where users store items 120, such as propane tanks or storage boxes, on a bulkhead 122 of the trailer 12. As illustrated, the offset coupler device 10 of the present invention not only moves the forward end 24 of the trailer 12 further away from the rear 116 of the cab 118, but also moves the bulkhead 122 further away from a rear of the bed 18 of the tow vehicle 20. This arrangement permits a user to back the tow vehicle 20 under the forward end 24 of the trailer until the kingpin 70 of the offset coupler 10 is received in the fifth wheel hitch 14 with a tailgate 124 in a down position, as illustrated in FIG. 1, and not have to worry about the tailgate 124 impacting the stored item 120.

Many variations can be made to the illustrated embodiment of the present invention without departing from the scope of the present invention. Such modifications are within the scope of the present invention. For example, the clamp member 44 could be omitted and the body portion 42 of the coupler 10 be attached to the skid plate 30 by some other method (such as simply by the bolts through the guide holes 62 and/or clamping the upper plate member 46 to the skid plate 30 and/or welding the upper plate member 46 to the skid plate 30 and/or some other method of mechanically connecting the upper plate member 46 to the skid plate 30) and still achieve the desire effect of offsetting the trailer 12 from the tow vehicle 20.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. An offset coupler device for use in connection with a trailer having a kingpin, wherein the trailer includes a skid plate from which the kingpin of the trailer depends downwardly, the device comprising:
    a first plate member having an opening there through for receiving a portion of the kingpin of the trailer, wherein the first plate member has an upper surface for abutting the skid plate during use;
    a support member coupled with the first plate member;
    a second plate member coupled with the support member, the second plate member having a kingpin extending downwardly from a lower surface thereof, wherein the kingpin of the second plate member is spaced apart from the opening in the first plate member, whereby a central longitudinal axis of the kingpin of the second plate member does not pass through the opening in the first plate member; and
    a means for coupling the device to the trailer, wherein the means for coupling the device to the trailer includes a clamp member, wherein the clamp member has first and second portions, a means for drawing the first and second portions together around a portion of the kingpin to clamp the clamp member thereto, and adjustable means for urging the first plate member against the skid plate to resist movement there between during use.

2. The device of claim 1, wherein the means for drawing the first and second portions together includes a first bolt.

3. The device of claim 2, wherein the first and second portions of the clamp member are generally block shaped with a sidewall having a semi-cylindrical groove therein, wherein the semi-cylindrical grooves in the sidewalls of the first and second portions of the clamp member cooperate to provide a generally cylindrical passage through the clamp member, and wherein the generally cylindrical passage is sized to receive a reduced diameter portion of the kingpin of the trailer.

4. The device of claim 3, wherein the means for drawing the first and second portions together further includes two generally horizontal bores in the first and second portions of the clamp member and a second bolt, wherein the two generally horizontal bores in the first portion align with the two generally horizontal bores in the second portion to provide two sets of aligned bores when the reduced diameter portion of the kingpin of the trailer is received in the generally cylindrical passage, wherein the first and second bolts are received in the aligned bores, and wherein the first and second portions of the clamp member may be drawn together around the kingpin to clamp the clamp member thereon by tightening the first and second bolts.

5. The device of claim 1, wherein the adjustable means for urging the first plate member against the skid plate includes a bolt extending between the first plate member and the clamp member, whereby tightening the bolt moves the first plate member away from the clamp member.

6. The device of claim 5, wherein the adjustable means for urging the first plate member against the skid plate further includes a first generally vertical bore through the clamp member, and wherein the bolt is received in the first generally vertical bore.

7. The device of claim 6, wherein the adjustable means for urging the first plate member against the skid plate further includes a plurality of vertical bores through the clamp member and a plurality of bolts received in the plurality of vertical bores.

8. The device of claim 1, wherein the opening has a central axis and wherein the central longitudinal axis of the kingpin of the second plate member and the central axis of the opening are spaced apart from each other a distance of five to eighteen inches.

9. An offset coupler device for use in connection with a trailer having a kingpin, wherein the trailer includes a skid plate from which the kingpin of the trailer depends downwardly, the device comprising:
   a first plate member having an opening there through for receiving a portion of the kingpin of the trailer, wherein the first plate member has an upper surface for abutting the skid plate during use;
   a support member coupled with the first plate member;
   a second plate member coupled with the support member, the second plate member having a kingpin extending downwardly from a lower surface thereof, wherein the kingpin of the second plate member is spaced apart from the opening in the first plate member, whereby a central longitudinal axis of the kingpin of the second plate member does not pass through the opening in the first plate member; and
   a means for coupling the device to the trailer, and wherein the means for coupling the device to the trailer includes a plurality of vertical bores through the first plate member and a plurality of bolts there through for bolting the first plate member to the skid plate.

10. An offset coupler device for use in connection with a trailer having a kingpin, wherein the trailer includes a skid plate from which the kingpin of the trailer depends downwardly, the device comprising:
   a first plate member having an opening there through for receiving a portion of the kingpin of the trailer, wherein the first plate member has an upper surface for abutting the skid plate during use;
   a support member coupled with the first plate member;
   a second plate member coupled with the support member, the second plate member having a kingpin extending downwardly from a lower surface thereof, wherein the kingpin of the second plate member is spaced apart from the opening in the first plate member, whereby a central longitudinal axis of the kingpin of the second plate member does not pass through the opening in the first plate member; and
   a means for coupling the device to the trailer, wherein the upper surface of the first plate member includes a recess therein adjacent the opening, whereby the recess provides for an improved coupling between the device and the trailer when a lower surface of the skid plate of the trailer is uneven or includes irregularities.

11. An offset coupler device for coupling a fifth wheel trailer having a kingpin extending downwardly from a kingpin plate to a tow vehicle having a fifth wheel hitch, the device comprising:
   a first plate member having a generally horizontal portion with upper and lower surfaces and an opening there through for receiving a portion of the kingpin of the trailer;
   first and second supports extending downwardly from the lower surface of the first plate member;
   a second plate member coupled with the supports, the second plate member having a generally horizontal portion with a kingpin extending downwardly from a lower surface thereof, wherein the kingpin of the second plate member is spaced apart laterally from the opening in the first plate member, whereby a central longitudinal axis of the kingpin of the second plate member does not pass through the opening in the first plate member; and
   a clamp member for coupling with the kingpin of the trailer when the kingpin of the trailer is received in the opening in the first plate member, the clamp member having first and second portions which cooperate to clamp the kingpin of the trailer there between and an adjustable means for urging the first plate member away from the clamp member, wherein at least a portion of the adjustable means for urging extends between the clamp member and the first plate member.

12. The device of claim 11, wherein the opening has a central axis and wherein the central longitudinal axis of the kingpin of the second plate member and the central axis of the opening are spaced apart from each other a distance of five to eighteen inches.

13. The device of claim 11, wherein the clamp member further includes at least one bolt in a generally horizontal orientation for drawing the first and second portions together around the kingpin of the trailer and wherein the adjustable means for urging includes at least one bolt passing through the clamp member in a generally vertical orientation and having a distal end which cooperates with the lower surface of the first plate member.

14. An offset coupler device for increasing the relative distance between a trailer and its tow vehicle during use, the trailer having a kingpin extending downwardly from a skid plate and the tow vehicle having a fifth wheel hitch, the device comprising:
   a body portion having an upper surface with an opening therein for receiving the kingpin of the trailer and a lower surface having a kingpin extending downwardly there from, the kingpin of the coupler being spaced apart from the opening, whereby a central longitudinal axis of the kingpin of the coupler does not pass through a center point of the opening;
   a clamp member for coupling with the kingpin of the trailer when the kingpin of the trailer is received in the opening in the body portion, the clamp member being in a spaced relationship from the body portion; and
   an adjustable means for urging the upper surface of the body portion against the skid plate to resist movement there between during use, wherein at least a portion of the adjustable means for urging extends between the clamp member and the body portion.

15. The device of claim 14, wherein the body portion includes an upper plate member, a lower plate member and a support, wherein at least a portion of the support is intermediate the upper and lower plate members.

16. The device of claim 15, wherein the upper plate member has an upper surface for abutting the skid plate of the trailer during use, wherein the opening is in the upper plate member, wherein the lower plate member has a lower surface for abutting the fifth wheel hitch of the tow vehicle during use, and wherein the kingpin of the coupler depends downwardly from the lower surface of the lower plate member.

17. The device of claim 14, wherein the adjustable means for urging the upper surface of the body portion against the skid plate includes a bolt threadably received in a bore in the clamp member.

18. The device of claim 14, wherein the clamp member has first and second portions, and wherein the first and second portions cooperate to clamp the clamp member to the kingpin of the trailer.

19. The mechanism of claim 18, wherein the first and second portions of the clamp member are generally block shape members, each having an inner sidewall, wherein each of the inner sidewalls have a semi-cylindrical groove therein for receiving a reduced diameter portion of the kingpin of the trailer when the clamp member is received on the kingpin of the trailer and wherein each of the inner sidewalls face each other in use.

20. The mechanism of claim 19, wherein the clamp member further includes two generally horizontal bores therein and two bolts, wherein the two bolts of the clamp member are received in the bores in the clamp member to draw the first and second portions of the clamp member together around the kingpin of the trailer.

21. A method of increasing the relative distance between a tow vehicle having a fifth wheel hitch and a trailer having a kingpin during use, the method comprising:

providing an offset coupler device having a body portion including an upper surface with an opening therein and a lower surface having a kingpin extending downwardly there from, the kingpin of the offset coupler device being spaced apart laterally from the opening;

receiving the kingpin of the trailer in the opening of the offset coupler;

coupling the offset coupler with the trailer; and receiving the kingpin of the offset coupler in the fifth wheel hitch of the tow vehicle.

22. The method of claim 21, wherein the offset coupler is coupled with the trailer via a clamp member.

23. The method of claim 22, wherein the clamp member has first and second portions, and wherein the first and second portions cooperate to clamp the kingpin of the trailer there between.

24. The method of claim 23, wherein the clamp member further includes an adjustable means for urging the upper surface of the body portion away from the clamp member, wherein at least a portion of the adjustable means for urging extends between the clamp member and the body portion.

\* \* \* \* \*